United States Patent Office 3,419,014
Patented Dec. 31, 1968

3,419,014
RECONSTITUTED TOBACCO
Raymond Joseph Moshy, Westport, Conn., assignor to American Machine & Foundry Company, a corporation of New Jersey
No Drawing. Filed Mar. 8, 1966, Ser. No. 532,573
8 Claims. (Cl. 131—17)

ABSTRACT OF THE DISCLOSURE

A reconstituted tobacco composition having 2,(4'-thiazolyl) benzimidazole as a fungicide.

The present invention relates to tobacco compositions and in particular to such compositions and their method of production which contain a fungicide to control fungal infections.

Reconstituted tobacco products well known in the art and exemplified in one or more of U.S. Patents 3,106,212, 3,185,161, 2,485,670, 2,707,472, 2,769,734, 3,000,383 are subject to "spoilage" like other perishable materials. The higher the moisture and temperature at which these products are stored, the greater is this rate of "spoilage." "Spoilage" (for the purposes of this disclosure) is defined as those changes which are brought about by metabolic processes resulting from microbial infections. From an aesthetic point of view, fungal infections are the least desirable.

Various commercial tobacco compositions have been developed which contain mold inhibitors or fungistats which successfully retard spoilage. Such compositions are shown in U.S. Patents 3,000,765 issued to S. Rosenberg and 3,000,764 issued to W. A. Drucker. These patents disclose the use of substances such as propandiol and butandiol which are successful under specific temperature and moisture conditions, in limiting or retarding spoilage for rather long but determinate periods. These substances are not, however, fungicides which kill and/or prevent the growth of microbial organisms over rather extended periods and under adverse temperature and moisture conditions. In addition, these substances generally have a dual function in tobacco sheet; they act as humectants primarily and mold inhibitors secondarily. For this reason, they are generally not as effective as broad spectrum mold inhibitors which are more specific.

The prime object of the present invention is to provide a method of producing and/or treating reconstituted tobacco compositions with a long lasting active broad spectrum antifungal agent more specific and more effective than that known in the prior art while being relatively safe for human consumption.

Specifically in accordance with the present invention, Thiabendazole sometime hereinafter abbreviated as TBZ, (an anti-helminthic agent produced by Merck & Company of Rahway, N.J., otherwise identified as 2,(4'-thiazolyl) benzimidazole: $C_{10}H_7N_3S$) having the following formula:

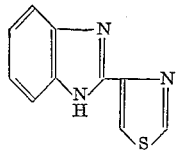

when applied to reconstituted tobacco products either while they are being made (as e.g. by incorporating it into the slurry, or by coating, etc.) or by post treatment (as e.g. by coating the finished sheet or the finished bobbin, etc.) has been found to produce products from which mold infection has been virtually eliminated.

According to the present invention no change is required at all in the normal recipes or processes in the formulation and manufacture of reconstituted sheet tobacco. Amounts as low as 50 p.p.m. of Thiabendazole (TBZ) were effective in eliminating fungal infections under mild storage conditions and amounts as high as 600 p.p.m. were most effective in eliminating fungal infections under extremely adverse storage conditions.

Optimum concentrations of fungicide are of course, dependent upon variations in tobacco type and level and the additives used in the manufacture of the sheet tobacco.

(A) In particular the following methods may be followed:

(1) INCORPORATION IN TOBACCO SLURRY

The thiabendazole agent is added to the tobacco slurry formed in accordance with any one of the aforementioned U.S. Patents 3,106,212, 3,185,161, 2,485,670, 2,707,472, 2,769,734, 3,000,383 prior to its being cast into sheet form and dried. The mechanics for accomplishing this involved the suspension or addition of an amount between about 50 and 600 p.p.m. of the thiabendazole to the tobacco water stream, which is subsequently con-mixed with a base web stream which contains all the other formulation ingredients to produce a tobacco slurry. This tobacco slurry is subsequently cast at an appropriate thickness on a moving stainless steel belt and is dried, coated (if desired), remoistened and subsequently doctored from the belt. The amount of mold inhibiting agent added is calculated on the basis of active fungicide per bone dry tobacco product.

Example I

In the preferred embodiment of this invention, 55 kilograms of tobacco dust (bone dry basis) is dispersed in sufficient water to form a slightly viscous dispersion (as e.g. at about 15% solids). To this is added from about 3 to about 50 grams of "active" thiabendazole powder, either as the pure material dissolved or dispersed in a suitable liquid or as a wettable powder suspended in water. The dispersion is then adequately mixed to insure homogeneous dispersion of the thiabendazole. This mixture is then blended with an aqueous adhesive mixture (18.3 kilograms bone dry basis) prepared in accordance with any of the aforementioned U.S. patents (as e.g. at about 5% solids) or blended with stem pulp alone as in the preparation of a 100% tobacco sheet. This slurry is subsequently cast at an appropriate thickness on a moving stainless steel belt, dried, coated (if desired), remoistened and doctored from the belt. The product prepared in accordance with this example at about 30–35% moisture and at a level of 600 p.p.m. thiabendazole will display the following type of storage stability to mold infection:

(1) Indefinite at 40–50° °F.
(2) Minimum of 3 weeks at 72° F.
(3) Minimum of 2 weeks at 90° F.

Note: All procedures were carried out by storing the finished tobacco products in double polyethylene bags in a moist atmosphere in order to prevent dehydration. In addition, tobacco sheets prepared in accordance with this example but *not* treated with TBZ, by comparison, say, for example, at 90° F. showed evidence of mold growth in about 1 week.

Example II

From about 3 to about 50 grams of "active" thiabendazole is added to an aqueous adhesive mixture (18.3 kilogram bone dry basis) as e.g. at about 5% solids. The above is then adequately mixed to insure homogeneous dispersion of the TBZ powder. To this mixture is added 55 kg. (bone dry basis) tobacco dust as e.g. at about 15% solids in water to form a uniform viscous paste. This paste is subsequently cast at an appropriate thickness on a moving stainless steel belt, dried, coated (if desired) remoistened and doctored from the belt. The product prepared in this way will display storage stability similar to that obtained as in Example I above.

Example III

From about 3 to about 50 g. of "active" TBZ is added to a non-aqueous adhesive mixture (18.3 kilogram bone dry basis) as e.g. at about 2% solids. The above is then adequately mixed to insure homogeneous dispersion of the TBZ. To this mixture is slowly added 55 kgs. (bone dry basis) of tobacco dust. The resultant mass is stirred to ensure homogeneity, cast at an appropriate thickness on a moving stainless steel belt, dried, coated (if desired) remoistened and doctored from the belt. The product prepared in accordance with this example will display storage stability similar to that obtained as in Example I above.

(2) INCORPORATION IN THE COATING SOLUTION

The thiabendazole agent can be incorporated directly into the final product by applying it in aqueous and non-aqueous coating solutions after the sheet has been formed. An example of such a coating solution is described in Fiore et al. U.S. 3,185,162, and can be applied directly to the surface of reconstituted sheet tobacco. It was found that levels of thiabendazole based upon the dried products after the removal of solvent equal to the levels of thiabendazole added in according to process I were most effective.

Example IV

From about 1 to about 12 g. of "active" TBZ is added to 17 kg. of an aqueous or non-aqueous system containing about 2% of a suitable coating material. The mixture is adequately mixed to insure homogeneous dispersion or solution (as the case may be), and this fluid is applied directly to the dry reconstituted sheet tobacco on a moving stainless steel belt by spraying or other commercially feasible means at a level such that the final product will contain about 50–600 p.p.m. of TBZ on a dry weight basis—e.g. by applying about 50 mg. coating solids to about 3.0 gm./ft.$^2$ of bone dry sheet. The sheet is then remoistened (if necessary) and doctored from the belt. The product prepared in accordance with this example when applying TBZ from a 95% isopropanol system at 30–35% final sheet moisture and at a level of 600 p.p.m. TBZ will display the following type of storage stability to mold infection:

(1) Indefinite at 40–50° F.
(2) Minimum of 6 weeks at 72° F.
(3) Minimum of 4 weeks at 90° F.

The product prepared as above but at 50 p.p.m. TBZ will display the following type of storage stability to mold infection:

(1) Indefinite at 40–50° F.
(2) Minimum of 6 weeks at 72° F.
(3) Minimum of 3 weeks at 90° F.

(3) APPLICATION TO EXPOSED SURFACES OF FINISHED SLIT BOBBINS

This method involves the uniform painting or spraying of all exposed surfaces of the finished slit bobbins of reconstituted tobacco with a preweighed sample of thiabendazole dissolved in a suitable solvent in this case 95 volume percent isopropanol. The TBZ can also be applied by using a wettable powder suspended in water. By exposed surfaces of the bobbins, we mean both the exposed surfaces of the reconstituted tobacco product and the exposed surfaces of the cardboard core material on which it is wound. Since the application of fungicide in this method is on the exposed surface of a wound bobbin, the basis for determining the amount of fungicide solution to be applied is calculated on a different basis than were the preceding tobacco slurry and coating solution additions. The area of the exposed bobbin surfaces is determined by measuring the significant bobbin dimensions, and using these measurements to calculate the surface area in square feet. For the purposes of calcualting the weight of mold inhibitor to be applied to a bobbin, the exposed surface area is converted to a weight by multiplying this area by a conversion factor of 3 grams per square foot (which is the normal sheet weight for this product). Therefore, the levels of mold inhibiting agent used in this test are not the levels in the total bobbins, but are the concentrations in the exposed surface layer of the bobbin, which is assumed to weigh 3 grams per square foot. Obviously, the level of mold inhibiting agent in the total bobbin would be much less, since the interior of the bobbin contains none of the inhibitor except that which penetrates by capillary action.

Example V

The weight of the exposed bobbin surface is determined and a preweighed amount of properly dissolved or suspended TBZ is painted or sprayed onto this surface such that from about 50 to 600 p.p.m. of TBZ will be contained thereon, e.g. from about 0.15 mg./3 g. exposed surface wt. to about 1.8 mg. per 3 g. of exposed surface weight.

The mold stability of this product will be at its maximum as long as the treated surface remains unbroken. However, once the surface is broken the product will display mold stability equivalent to untreated materials.

In the case where 95% isopropanol is used for the TBZ application, one may expect to encounter the following type of stability with from 50 to 600 p.p.m. TBZ:

(1) Indefinite at 40–50° F.
(2) Minimum of 8 weeks at 72° and 90° F.

It will thus be seen that the objects set forth above, among those made apparent from the preceding description, are efficiently attained.

I claim:

1. A smoking tobacco composition, wherein said composition has applied thereto 2,(4′-thiazolyl)benzimidazole, which acts as a fungicide.

2. The smoking tobacco composition according to claim 1, wherein said 2,(4′-thiazolyl)benzimidazole is coated on the tobacco.

3. The smoking tobacco composition in accordance with claim 1, wherein said tobacco is reconstituted and has incorporated as an additive therein said 2,(4′-thiazolyl)benzimidazole.

4. A composition of matter in accordance with claim 1 containing between 50 and 600 parts per million of said 2,(4′-thiazolyl) benzimidazole.

5. A method of making reconstituted tobacco compositions to control fungus growth therein comprising, forming said reconstituted tobacco composition with 2,(4′-thiazolyl)benzimidazole.

6. The method of making a reconstituted tobacco sheet according to claim 5 in which said sheet is coated with said 2,(4′-thiazolyl)benzimidazole.

7. A smokable tobacco product containing the composition of claim 1.

8. A smokable tobacco product containing the composition of claim 2.

References Cited

UNITED STATES PATENTS

| | | | |
|---|---|---|---|
| 3,000,764 | 9/1961 | Drucker | 131—17 |
| 3,000,465 | 9/1961 | Rosenberg | 131—17 |

FOREIGN PATENTS 436,445  10/1935  Great Britain.

OTHER REFERENCES

Staron et al., Chemical Abstracts, vol. 63, p. 7592c, 1965, QD 1A51.

SAMUEL KOREN, *Primary Examiner.*

D. J. DONOHUE, *Assistant Examiner.*

U.S. Cl. X.R.

131—140, 142